March 23, 1943. A. F. MILBRATH 2,314,549
COMBINATION REDUCING AND REVERSING DRIVE UNIT
Filed Jan. 6, 1940 2 Sheets-Sheet 1

INVENTOR
ARTHUR F. MILBRATH
BY
Wheeler, Wheeler & Wheeler
ATTORNEYS.

March 23, 1943.    A. F. MILBRATH    2,314,549
COMBINATION REDUCING AND REVERSING DRIVE UNIT
Filed Jan. 6, 1940    2 Sheets-Sheet 2

INVENTOR
ARTHUR F. MILBRATH
BY
Wheeler, Wheeler & Wheeler
ATTORNEYS.

Patented Mar. 23, 1943

2,314,549

UNITED STATES PATENT OFFICE 2,314,549

COMBINATION REDUCING AND REVERSING DRIVE UNIT

Arthur F. Milbrath, Milwaukee, Wis., assignor to Wisconsin Motor Corporation, Milwaukee, Wis., a corporation of Wisconsin Application January 6, 1940, Serial No. 312,652

2 Claims. (Cl. 74—376)

This invention relates to improvements in combination reducing and reversing drive units. The invention has particular application to an inboard marine engine drive in which heretofore it has been the general practice to use a speed reducing transmission in one case where a speed reduction is desired, and to provide a reversing gear set in a different case.

It is the primary object of the present invention to provide a novel and improved and extremely compact and simple, trouble-free, combination speed reducing transmission and reversing gear set specifically adapted for marine use.

More specific objects of the invention include the provision of a novel means for mounting and operating the clutch shifting device by means of which the drive is changed from forward to reverse and vice versa. Other objects will be apparent to those skilled in the art upon study of the following disclosure of the invention.

In the drawings.

Like parts are identified by the same reference characters throughout the several views.

Figure 1:
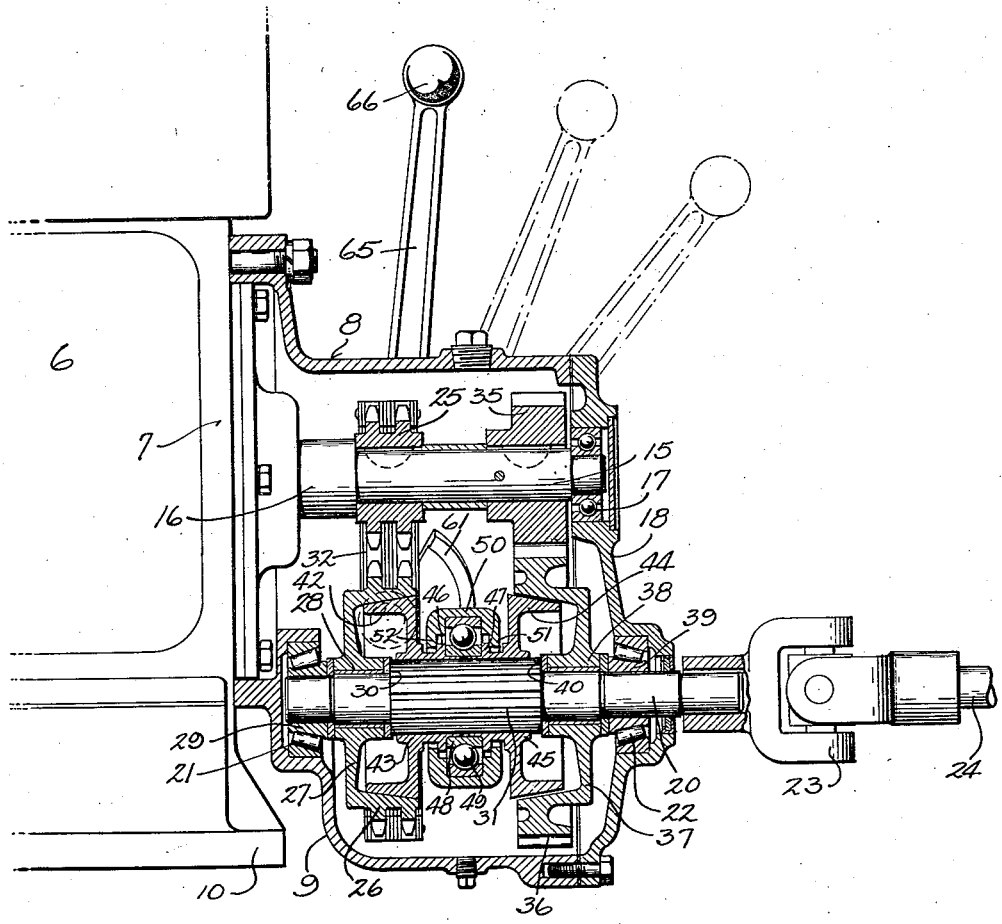
Fig. 1 is a view showing my device in longitudinal section as it appears between the crank shaft and drive shaft of a marine engine installation.
Figure 5:
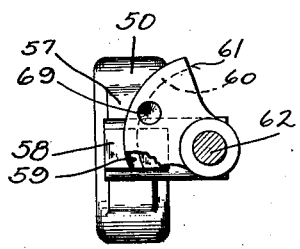
Fig. 5 is a detail taken on line 5—5 of Fig. 4.

The prime mover 6 may obviously be of any desired design. To its crank case portion 7 is bolted the housing 8 in which the improved gear set of this invention is contained. The lower portion 9 of the gear set housing 8 is offset rearwardly to clear the engine base 10.

The extension 15 of the engine shaft 16 is provided with an anti-friction bearing at 17 in the removable closure plate 18 at the rear of housing 8. The extension shaft 15 constitutes the driving shaft of the gear set.

Arranged to operate at a reduced speed either forwardly or in reverse with respect to shaft 15 by means hereinafter to be disclosed, is the driven shaft 20 which has a forward bearing at 21 in the casing 8 and a rearward bearing at 22 in the closure plate 18 for the casing. Power may be taken from shaft 20 by means of the conventional universal joint 23 and the associated drive shaft 24 leading to the propeller or other driven mechanism.

At its forward end the extension or driving shaft 15 carries a dual sprocket 25. Directly beneath this sprocket 25 on the driven shaft 20 is a dual sprocket 26 of larger diameter formed on the outside of a clutch member 27 of which the hub portion 28 is mounted to turn freely with respect to shaft 20 on a suitable bushing between the inner race 29 of the anti-friction bearing 21 and the shoulder 30 on the splined central portion 31 of shaft 20. The sprockets 25 and 26 are connected by the chain 32 to rotate in the same direction.

At the rear end of the extension or driving shaft 15 is a gear 35. This gear meshes directly with a driven gear 36 mounted on a clutch element 37 carried by a hub portion 38 which is free to rotate about shaft 20 on a bushing confined between the inner race 39 and the anti-friction bearing 22 and the shoulder 40 at the end of the notched splined shaft section 31. Gears 35 and 36, being in direct mesh, will rotate in opposite directions.

Each of the clutch elements 27 and 37 comprises a hollow dished member with a tapered interior surface. The open sides of the two clutch members face each other in spaced relation at opposite ends of the central splined section 31 of the driven shaft 20.

Coacting with the clutch member 27 is a driven clutch element 42 having its hub portion 43 splined on the central portion 31 of the driven shaft 20.

Coacting with the driving clutch element 37 is a driven clutch element 44 having its hub portion 45 splined to the central portion 31 of the driven shaft 20. At points spaced from their respective ends the hub portions 43 and 45 of the respective driven clutch elements are peripherally flanged at 46 and 47 respectively. Between the flanges the spaced end portions of the hubs 43 and 45 are reduced in diameter to receive the inner race 48 of an anti-friction bearing 49. This race maintains the hub portions 43 and 45 at the desired spacing. They are kept from separation by the semi-circular shifting device 50 which is channeled to receive the outer race of the anti-friction bearing and has forwardly projecting inner peripheral arcuate flanges 51 and 52 which are engaged outside of flanges 47 and 46 respectively to secure the clutch elements, through their respective hubs, against separation. Thus the assembly maintains the driven clutch elements in fixed relative positions respecting each other, the ball race 48 preventing them from moving closer together and the interlocking flanges 51 and 52 preventing them from moving farther apart. Consequently they are required to move as a unit upon the splined shaft section 31. Their spacing is such that they may be adjusted to an intermediate position in which neither of the driven clutch elements 42 or 44 engages its respective driving clutch element 27 or 37. From this position the shifting unit and the two driven clutch elements may be adjusted unitarily either forwardly or rearwardly. If moved forwardly the clutch element 42 will engage the driving clutch element 27 as shown in Fig. 1 to cause the driven shaft 20 to rotate in the same direction as the driving shaft 15. If clutch element 44 is moved rearwardly the drive through the chain 32 will be interrupted and motion will be transmitted through gears 35 and 36 and the driving clutch element 37 and driven clutch element 44 to cause the driven shaft to rotate reversely with respect to the driving shaft 15. Through this simple means it is possible to operate the driven shaft either forwardly or reversely and also at a reduced speed if desired, through a simple mechanism supplied in a single housing.

For marine purposes the type of shifting device now to be described is well adapted. Within the housing 8 I provide a guide rod 55 upon which the sleeve 56 is reciprocable. An arm 57 projecting laterally from sleeve 56 carries the shipper 50.

Projecting laterally from the sleeve 56 opposite the arm 57 which carries shipper 50, is a boss 58 grooved at 59 to receive a cam flange 60 formed on the rim of a segment 61 which is carried by rock shaft 62.

Figures 2, 3:
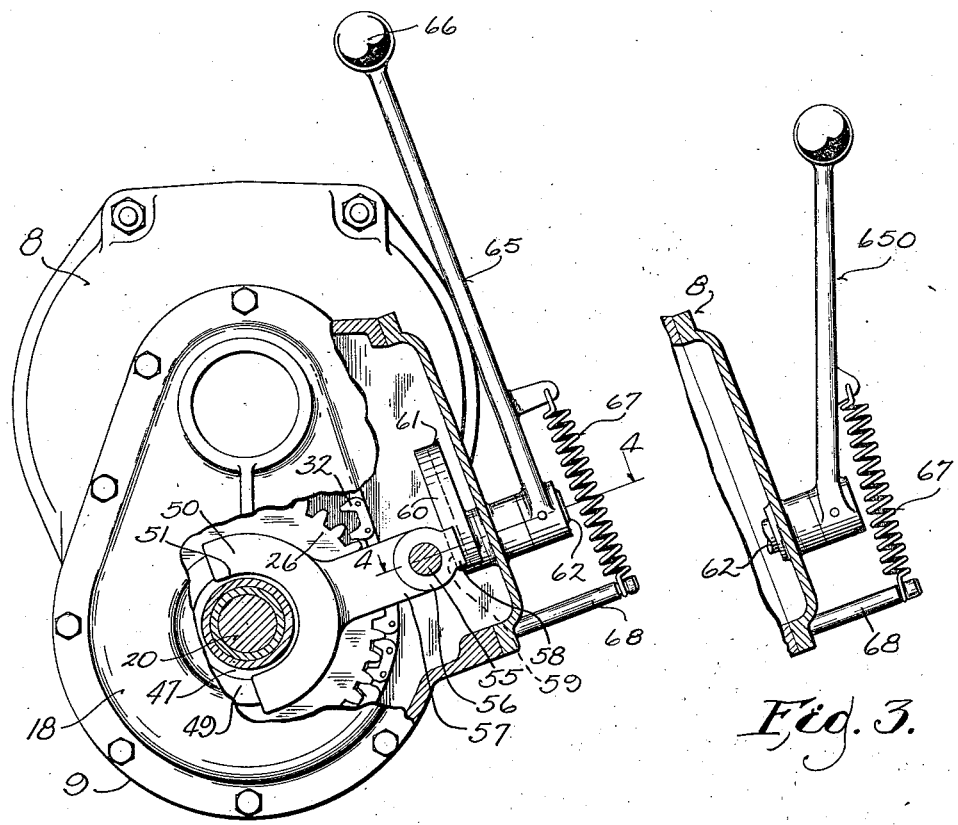
Fig. 2 is a rear elevation of the device with the casing partially broken away to expose portions of the operating mechanism.
Fig. 3 is a fragmentary view somewhat similar to Fig. 2, showing a modified embodiment of the invention.
Figure 4:
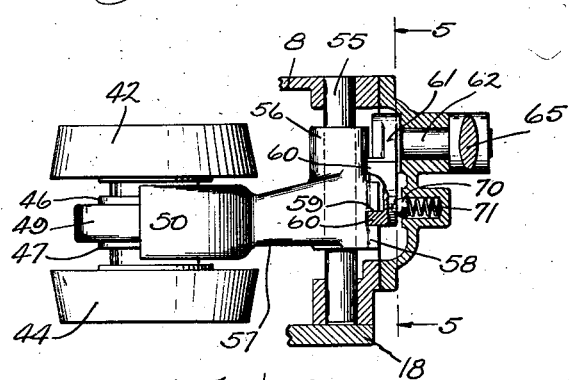
Fig. 4 is a detail view taken on line 4—4 of Fig. 2.

The rock shaft 62 is rotatable in a bearing provided in the side of the housing 8. This rock shaft 62 and the rod 55 upon which the shipper slides, and the driven shaft 20, are preferably all located in a common plane which is not horizontal but inclined upwardly as shown in Fig. 2 so that the shifting lever 65 mounted on the rock shaft 62 will extend upwardly at an angle such that its handle 66 will lie over housing 8 in a position near the center of the boat, to be conveniently operated from any desired point of vantage. However, where it is desired to operate the lever from one side only, it may be set at an oblique angle on shaft 62 as shown at 65a in Fig. 3.

In either case I prefer to employ a tension spring 67 connected between a lug on the hand lever 65 (or 65a) and an anchorage post 68 carried by the housing 8. This spring tends to maintain the lever oscillated to one or the other of its extreme positions. In order to hold the lever in its central position where neither of the clutch elements 42 or 44 is engaged, I provide segment 61 with a socket 69 in a position to be engaged by the ball detent 70 which is pressed therein by a spring 71 seated in a pocket formed in housing 8.

Obviously the ball detent 70 provides a neutral position in which any motion is transmitted from shaft 15 to shaft 31. When the hand lever is oscillated forwardly its oscillation is transmitted through the rock shaft 62 and the segment 21 and the cam flange 60 to the sleeve 56, causing the sleeve to slide forwardly on the supporting rod 55 to adjust the shipper in a forward direction. This engages the driven clutch element 42 with the driving clutch element 27 to transmit forward motion to shaft 20 in the same direction in which shaft 15 operates.

When the hand lever 65 is oscillated rearwardly a like sequence of movements causes the shipper to move rearwardly, thereby engaging the driven clutch element 44 with the driving clutch element 37 to rotate the driven shaft 20 in a reverse direction with respect to the driving shaft 15. This unit is sufficiently simple and compact and powerful to be used for marine purposes to supplant the separate reduction drives and reversing gear mechanisms heretofore employed.

I claim:

1. In a marine drive, the combination with an engine having a crank case and a crank shaft, of an auxiliary case connected with the engine crank case and for which the engine crank case constitutes a closure, a bearing in the auxiliary case aligned with the crank shaft, a shaft supported in part in said bearing and in part by said crank shaft, a driven shaft supported in said auxiliary case, said case having bearings for said driven shaft adjacent said crank case and remote therefrom, driving and driven sprockets mounted on the respective shafts, one sprocket being fast to one of said shafts and the other sprocket being rotatable respecting the other, a chain connecting said sprockets, driving and driven gears mounted on said shafts, one of said gears being fast to the shaft to which the first mentioned sprocket is fast and the other of said gears being rotatable with respect to the other shaft, and means for selectively clutching said other shaft to the sprocket and the gear rotatable with respect thereto.

2. In a marine drive, the combination with an engine having a crank case portion and a crank shaft, of an auxiliary case unitarily connected to the crank case portion of the engine and for which said engine crank case portion constitutes a closure, a driven shaft below the level of said crank shaft and for which said auxiliary case provides bearings adjacent said crank case and remote therefrom, a crank shaft extension aligned with the engine crank shaft and supported thereby at one end, said auxiliary case providing bearings for the remote end of said extension, and driving connections from the crank shaft extension to the other shaft in said auxiliary case, said other shaft being located near the bottom of crank case portion of said engine and arranged to receive substantially the entire power of the engine crank shaft and projecting from said auxiliary case to deliver such power to a propeller shaft at a substantially more favorable angle than such propeller shaft would have if directly connected with the engine crank shaft.

ARTHUR F. MILBRATH.